United States Patent
Zoldi et al.

(10) Patent No.: US 10,896,381 B2
(45) Date of Patent: Jan. 19, 2021

(54) BEHAVIORAL MISALIGNMENT DETECTION WITHIN ENTITY HARD SEGMENTATION UTILIZING ARCHETYPE-CLUSTERING

(71) Applicant: FAIR ISAAC CORPORATION, San Jose, CA (US)

(72) Inventors: Scott Michael Zoldi, San Diego, CA (US); Joseph F. Murray, San Diego, CA (US)

(73) Assignee: Fair Isaac Corporation, Roseville, MN (US)

( * ) Notice: Subject to any disclaimer, the term of this patent is extended or adjusted under 35 U.S.C. 154(b) by 877 days.

(21) Appl. No.: 15/074,856

(22) Filed: Mar. 18, 2016

(65) Prior Publication Data

US 2017/0270428 A1    Sep. 21, 2017

(51) Int. Cl.

| | |
|---|---|
| *G06Q 10/00* | (2012.01) |
| *G06F 15/16* | (2006.01) |
| *G06F 16/33* | (2019.01) |
| *G06Q 30/02* | (2012.01) |
| *G06N 20/00* | (2019.01) |
| *G06Q 30/06* | (2012.01) |
| *G06Q 10/10* | (2012.01) |
| *G06N 7/00* | (2006.01) |

(52) U.S. Cl.
CPC ............ *G06N 20/00* (2019.01); *G06N 7/005* (2013.01); *G06Q 10/10* (2013.01); *G06Q 30/06* (2013.01)

(58) Field of Classification Search
CPC ...... G06N 99/005; G06N 20/00; G06N 7/005; G06Q 40/00; G06Q 10/10; G06Q 30/06

USPC .................................................. 706/1–62; 1/1
See application file for complete search history.

(56) References Cited

U.S. PATENT DOCUMENTS

| | | | | |
|---|---|---|---|---|
| 2006/0010206 | A1* | 1/2006 | Apacible | G06F 15/16 709/205 |
| 2006/0294095 | A1* | 12/2006 | Berk | G06Q 10/04 |
| 2007/0118498 | A1* | 5/2007 | Song | G06F 16/337 |
| 2008/0249999 | A1* | 10/2008 | Renders | G06F 17/3071 |
| 2009/0248497 | A1* | 10/2009 | Hueter | G06N 20/00 705/7.29 |
| 2009/0307049 | A1* | 12/2009 | Elliott, Jr. | G06Q 30/0201 705/7.29 |
| 2010/0082605 | A1* | 4/2010 | Dupret | G06N 7/005 707/722 |

(Continued)

FOREIGN PATENT DOCUMENTS

EP    2555153 A1    2/2013

*Primary Examiner* — Brandon S Cole

(74) *Attorney, Agent, or Firm* — Mintz Levin Cohn Ferris Glovsky and Popeo, P.C.

(57) ABSTRACT

An automated way of learning archetypes which capture many aspects of entity behavior, and assigning entities to a mixture of archetypes, such that each entity is represented as a distribution across multiple archetypes. Given those representations in archetypes, anomalous behavior can be detected by finding misalignment with a plurality of entities archetype clustering within a hard segmentation. Extensions to sequence modeling are also discussed. Applications of this method include anti-money laundering (where the entities can be customers and accounts, as described extensively below), retail banking fraud detection, network security, and general anomaly detection.

30 Claims, 8 Drawing Sheets

(56) References Cited

U.S. PATENT DOCUMENTS

| | | | |
|---|---|---|---|
| 2010/0228580 A1* | 9/2010 | Zoldi | G06Q 40/025 705/38 |
| 2011/0178844 A1* | 7/2011 | Rane | G06Q 30/0282 705/7.31 |
| 2011/0178848 A1* | 7/2011 | Rane | G06Q 30/0202 705/7.31 |
| 2011/0265023 A1* | 10/2011 | Loomis | G06F 3/04812 715/771 |
| 2011/0314039 A1* | 12/2011 | Zheleva | G06F 16/437 707/767 |
| 2012/0215560 A1* | 8/2012 | Ofek | G16H 40/67 705/3 |
| 2014/0156806 A1* | 6/2014 | Karpistsenko | G06Q 50/28 709/219 |
| 2016/0171380 A1 | 6/2016 | Kennel et al. | |

* cited by examiner

BEHAVIORAL MISALIGNMENT DETECTION WITHIN ENTITY HARD SEGMENTATION UTILIZING ARCHETYPE-CLUSTERING

TECHNICAL FIELD

The subject matter described herein relates to comparing entities within hard segmentation schemes by clustering entities within that segment into behavioral archetypes. Further, detecting behavior anomalies based on deviations from the typical sub clusters of entities in the hard segmentation based on behavior soft clustering utilizing behavioral archetypes.

BACKGROUND

Money laundering is a complex, worldwide problem, with estimates of $800B to $2T USD being laundered every year. Money laundering is the process of taking funds from an illicit activity and manipulating them through the financial system such that they appear to be from a different and legitimate source. Laundering typically includes three steps: (1) placement, where the illicit funds are first introduced to the financial system, (2) layering, where the illicit funds are combined through multiple transactions with legitimate sources, and (3) integration, where the illicit funds are returned to the launderer through seemingly legitimate transactions.

Money laundering occurs through a wide variety of financial products and access channels, including current accounts (EFT/ACH/SWIFT, wire, check, cash), loans, investment products, credit cards (purchases, returns, over payments) and debit cards (traditional and pre-paid). A recent proliferation of technologies, from mobile payments to cryptocurrencies, has increased the difficulty of finding a comprehensive solution.

An important related area is Combating Financing of Terrorists (CFT), which attempts to prevent funds from any source, whether originally legitimate or illicit from flowing to known terrorist organizations and individuals. Because many of the same techniques of money laundering (placement, layering and integration) are used in terrorist financing, we consider the problems of AML and CFT as related, and generically when we refer to AML we also include those related aspects of CFT.

Traditional approaches to anti-money laundering (AML) have focused on rules-based systems to meet specific regulatory requirements. For example, the US Bank Secrecy Act of 1970 required enhanced reporting of transactions exceeding $10,000, however basic rules like these were easily circumvented by breaking up transactions into smaller amounts. These traditional rule systems will often create rules based on assigning the customer to a customer segment; however the determination of which customer segment a particular customer belongs is often made based on initial application data, which may be falsified or out-of-date. For customers assigned to the wrong segment, these rule sets may be inaccurate and ineffective for fighting money-laundering and terrorist financing. Criminals then focus their activities on attempting to game the system to be assigned to preferred customer segmentation where the rules to detect AML are more lenient.

SUMMARY

The subject matter described here is an automated method of learning archetypes which capture many aspects of entity behavior, and assigning those entities to a mixture of archetypes, such that each entity is represented as a soft-clustering across multiple archetypes. Given those representations in archetypes, anomalous behavior can be detected by finding misalignment with the archetype clustering. Extensions to sequence modeling are also discussed. Applications of this method include anti-money laundering (where the entities can be customers and accounts, as described extensively below), retail banking fraud detection, network security, and general anomaly detection.

In one aspect, methods having one or more operations, systems having at least one programmable processor and a machine-readable medium storing instructions that, when executed by the at least one processor, cause the at least one programmable processor to perform one or more operations, and non-transitory computer readable media storing instructions which, when executed by a processor, cause the processor to perform one or more operations.

The operations can include maintaining one or more profiles in a data store for a plurality of entities of interest. Each of the one or more profiles can be formed as a data structure that captures statistics of one or more behaviors of an entity associated with the profile. The data structure can include demographic information associated with the entity. One or more models can be generated based on the captured statistics of one or more behaviors of the plurality of entities. The one or more models can be used by the computer processor for predicting a behavior of a new entity of interest.

The plurality of entities of interest can be assigned to hard segments of a segmentation scheme. Individual ones of the plurality of entities of interest can be assigned to a set of archetypes. The set of archetypes can be an archetype distribution and generated based on the generated one or more models. Each archetype of the set of archetypes can indicate at least one behavior characteristic that the entities assigned to that archetype have in common.

A transaction performed by an entity can be identified. The at least one behavior characteristic of the entity can be used to produce an archetype distribution to which the entity is assigned.

A variation over time can be determined between the archetype distribution to which the entity, of the plurality of entities of interest, is assigned and a distance from the set of archetypes associated with other entities in the hard segmentation to which the entity is assigned.

A soft clustering misalignment score can be based on the determined variation. The soft clustering misalignment score can indicate the degree of variation between the archetype distribution to which the entity is assigned and the set of archetypes associated with the other entities in the hard segmentation to which the entity is assigned. An alert can be generated in response to identifying that the determined soft clustering misalignment score for the entity exceeds a threshold.

A report can be generated indicating entities having a soft-clustering misalignment score that is indicative of a need for further anti-money laundering investigation. A report can be generated indicating entities having a soft cluster misalignment score that exceeds a threshold indicative that the entity needs to be reassigned to a different hard segment.

An entity can be identified that has a soft cluster misalignment score indicative that the entity has migrated over time from a first soft clusters of archetypes to a second soft cluster of archetypes. A report can be generate indicating that the identified entity exhibits sleeper behaviors or radicalization.

In some variations, the plurality of entities can be assigned to a set of archetypes. The set of archetypes can be an archetype distribution. The assignment can be based on entity transaction behavior information, entity demographic information, and/or the like.

In some variations, one or more streams of data associated with the plurality of entities can be received. The models can be generated based on the received streams of data. The one or more streams of data can include transaction data associated with the plurality of entities of interest. The one or more streams of data can include demographic markers associated with the plurality of entities of interest. The at least one behavior characteristic of at least one archetype of the set of archetypes can be updated. The updating can be based on an update to the models caused by the received one or more streams of data associated with the plurality of entities.

The one or more models can be configured to translate the captured statistical behavior to the set of archetypes.

Each archetype of the set of archetypes, to which an entity is assigned, can indicate a behavior of the entity. Each entity of the plurality of entities of interest can be assigned to multiple archetypes of the set of archetypes. Assigning individual ones of the plurality of entities of interest to a set of archetypes can include utilizing, collaborative profiling of behavior events associated with the plurality of entities of interest. The behavior events can be associated with financial transactions performed by the plurality of entities. Capturing behavior events can be done by using recurrent networks technology to capture sequences of behavior events.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
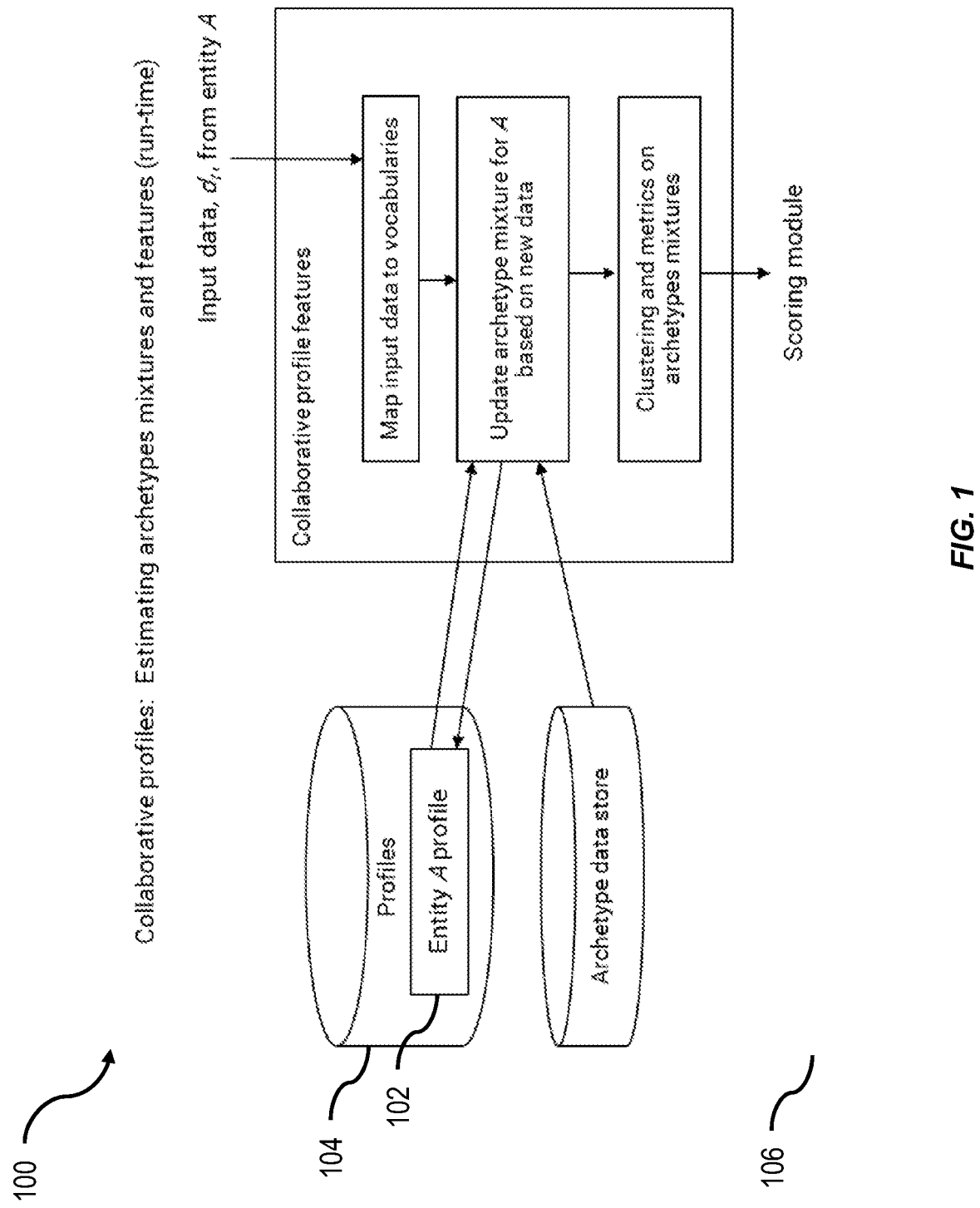
FIG. 1 is a schematic illustration of an online archetype learning system (based on collaborative profiling) having one or more features consistent with the present description.

To address these and potentially other issues with currently available solutions, methods, systems, articles of manufacture, and the like consistent with one or more implementations of the current subject matter can, among other possible advantages, provide a plurality of profiles for a plurality of entities of interest in a data store and an automated method of learning archetypes which capture many aspects of entity behavior. These archetypes can then be leveraged to determine a soft clustering of groupings of customers within individual hard customer segmentations. A particular hard customer segment may have one or more soft clusters of grouping of customers based on clustering of similar archetype distributions. Deviation from the major clusters of customers based on archetype within the segment, by an entity, can initiate generation of an archetype misalignment score based on the variation between the deviating entity's archetype distribution compared to the major soft-clusters of archetype behaviors within the hard segment. The archetype misalignment score can provide an indication of a likelihood of money laundering, financing of terrorist activities, or the like through behavior abnormality but also importantly from misclassification of the customer within a hard segment on which detection rules are applied.

In some exemplary implementations, entities can be assigned to different archetypes based on one or more characteristic. For example, by the type of customer that the entity is, behavior of an entity's account, or the like. The entities can be assigned to a mixture of archetypes, such that each entity is represented as a soft-clustering across multiple archetypes. The archetypes are updated for each new record of information received for the entity. The information received can include, for example, financial transaction information, customer information, demographic information, affiliate information, or the like.

In some exemplary implementations, numerical features can be constructed from the archetype mixtures and their clustering, which can be used in anti-money laundering (AML) applications. The AML applications can be configured to determine, within an initially assigned fixed customer segmentation, what customers are clustered together. The cluster can yield the normal manifold of customers vs. customers that are anomalous. Identification of anomalous customers within a customer segment can point to misclassification within the customer segmentation.

The AML applications can alert financial institutions to activity that is similar to observed laundering activity across all customer segments. The alert of money laundering activities can be based on a soft-clustering approach. The soft-clustering approach can be independent of initially assigned fixed customer segmentation. The soft-clustering approach can be used to indicate misalignment with the hard segment that a customer is assigned and consequently the non-reliability of AML rules applied to that individual. Soft-clustering based on archetypes can indicate that a customer may belong to a different hard segment and is misclassified or that the customer does not belong to any natural hard segment on which detection rules may be applied.

The AML application can alert financial institutions to rapid changes in soft-clustering archetypes. Rapid changes in soft-clustering archetypes can point to 'sleeper' behaviors where the entity that may be engaged in laundering is mimicking a good customer, or non-money laundering customer, to gain the confidence of a financial institution over time.

In some variations, the AML application can alert financial intuitions to rapid changes in soft-clustering archetypes that point to change of behaviors that may indicate radicalization of the entity.

In some variations, the AML application can alert financial intuitions to rapid changes in entity behaviors based on the entity changing from belonging to one soft cluster to another soft cluster that has higher AML risk.

Soft-clustering of entities can facilitate the tracking of changes in transactional behavior of an entity over time. Consequently, soft-clustering is much less sensitive to deceptive applications that drive traditional rigid customer segmentation. Consequently the detection of anomalous behavior, and therefore individuals involved in illegal activities, can be increased.

Regulations require that Suspicious Activity Reports (SARs) be filed in cases with sufficient suspicion of wrongdoing. Traditional AML rules systems create a high-volume of alerts, and only a small fraction of these alerts will be investigated and lead to a SAR filing with regulators. An important goal is to prioritize alerts, to find those cases with the highest likelihood of laundering activity. Unusual deviations in soft-clustering, or changes in clustering associations are an important measure to prioritize alerts in existing traditional rule-based AML systems, as well as to trigger investigations where no rules were activated.

In some exemplary implementations, multiple major sources of data can be fused together as input to the method for soft-clustering of entities across multiple archetypes. The sources of data can include, for example, customer information, transactional information and the like.

Regulations require that institutions track details of their customers, which are referred to as Know Your Customer (KYC) rules. KYC information can include:
  a) Identity confirmation, including personal and business information on the nominal and beneficial owners of an account.
  b) Risky countries
  c) Political exposed persons
  d) Watch-lists
  e) Enhanced Due Diligence (EDD) in cases of suspected higher risk, which includes source of wealth/funds, nature of business, the customers of that business, references, etc. Some of this information may be in unstructured plain text.

Traditional processes include vetting this information during on-boarding. The presented method uses on-boarding information, as well as any updates to the KYC information, presented over the lifetime of the customer's relationship with the institution. Customer information data can be presented to the system interspersed with transactional information. Customer information can be used to affect the soft-clustering. It is worth noting that the same manipulation of KYC information or collusion of financial institution employees, during onboarding of an entity with the financial institution, will lead to apparent inconsistencies, and soft-clustering anomalies will detect the inconsistencies in the segment assignment based on the initial customer information. Therefore, the presently described subject matter can identify wrongdoing by bank employees as well as the entities doing the wrongdoing.

In some exemplary implementations, users of the presently described systems can utilize, at least, a measure of inconsistency of customers belonging to the initially assigned KYC segmentation which would cause a review of the customer segmentation and transaction activity.

Transactional information can include monetary financial transactions (for example monetary transfers, payments, debits, fees, or the like), and non-monetary information (for example banking login events from internet-connected devices, beneficiary creation, address changes, credential changes, or the like).

FIG. 1 is a schematic illustration of an online learning system 100 having one or more features consistent with the present description. In some variations, for each entity of interest (for example, customers, accounts, or the like) a profile 102 can be created. An entity profile 102 can include a data structure which captures statistics of the entity's behavior in an efficient way, without storing the entire record of the past activity. The profile is persisted into a data store 104. The profile can be retrieved and updated for each input data record (for example, for each transaction, customer update, or the like). Key to the profiling concept, is that the profile does not contain a set of previous records, instead, it stores the most recent estimate of the soft-clustering and associated recursive transaction activity variables and demographic data which drive the soft-clustering analytics. This can reduce and/or save data store retrieval operations, typically limited to one per entity and any relevant global profiles, resulting in systems which are fast enough to run in real-time, which enables real-time decisioning, including blocking of suspicious activity (for example, money laundering, funding terrorist activities, or the like).

Some examples of specific profile features can include exponentially decayed averages of the transaction amounts, event averages of transaction amounts to different countries, payee identities, or the like. The profiles can include decay constants chosen to approximate various long-term and short-term averages. The decay constants can be determined based on a modeling of transactions by the entities of interest. The decay constants can be determined based on the archetyping of the entities.

Differences between expected and actual (for example, long-term vs short-term) behavior is often an important indicator of money laundering activity. Such changes in behavior can occur in money laundering scenarios where a sleeper account is created with the intention of appearing normal, and circumventing rules typically applied to young accounts, where young-account behavior is monitored.

Changes in account behavior can also be detected through transactional changes in cases where a customer is radicalized toward terrorism, or otherwise coerced into, supporting terrorist funding. Detecting changes in learned soft-clustering based on transactional information provides important methods for CFT as well as AML.

Collaborative profiling techniques can be used to determine "archetypes" from streams of transaction data and demographic markers associated with customers and accounts. This methodology allows for a continually changing determination of soft-clustering archetypes associated with an entity in a customer segment and a comparison to the pool of customers associated with that segment. As described earlier, it is also used to determine when archetypes are changing too rapidly or too strongly which indicate changes in behavior or trends in movement in the space of archetypes that are uncharacteristic with the known previous soft-clustering based archetypes of the customer/account and within their associated hard segment.

To determine archetypes, we take a high-dimensional space of streams of demographic, non-monetary, and monetary financial transactions and build models that will translate from the observed data space to a lower dimensional 'archetype' space, which encompasses the modes of collective behaviors typically seen in the financial system. In some exemplary implementations, the observed data is modeled with a statistical "topic model." The elements of the model can include directly observed discrete demographic, non-monetary, and monetary financial data elements. The derived recursive profile variables can include those described above and "topics" can be imputed archetypes determined, through estimation, by the topic model.

The Latent Dirichlet Allocation (LDA) model can be used. The LDA model includes a Bayesian probabilistic method which simultaneously estimates probability distributions over archetypes (topics) for each of the profiled entities, and a probability distribution of discrete demographic, non-monetary, and monetary financial data and derived transaction profile variable value (words) for each topic. The latter, when in the form of a matrix for a LDA model, can represent collective behaviors relating observed financial system data and profile variables to discovered archetypes. The number of archetypes is usually substantially lower than the cardinality of the word space so it can be considered a dimensionality reduction method. Thereby increasing processing efficiency as well as being economical to store in a data repository.

Figure 2:
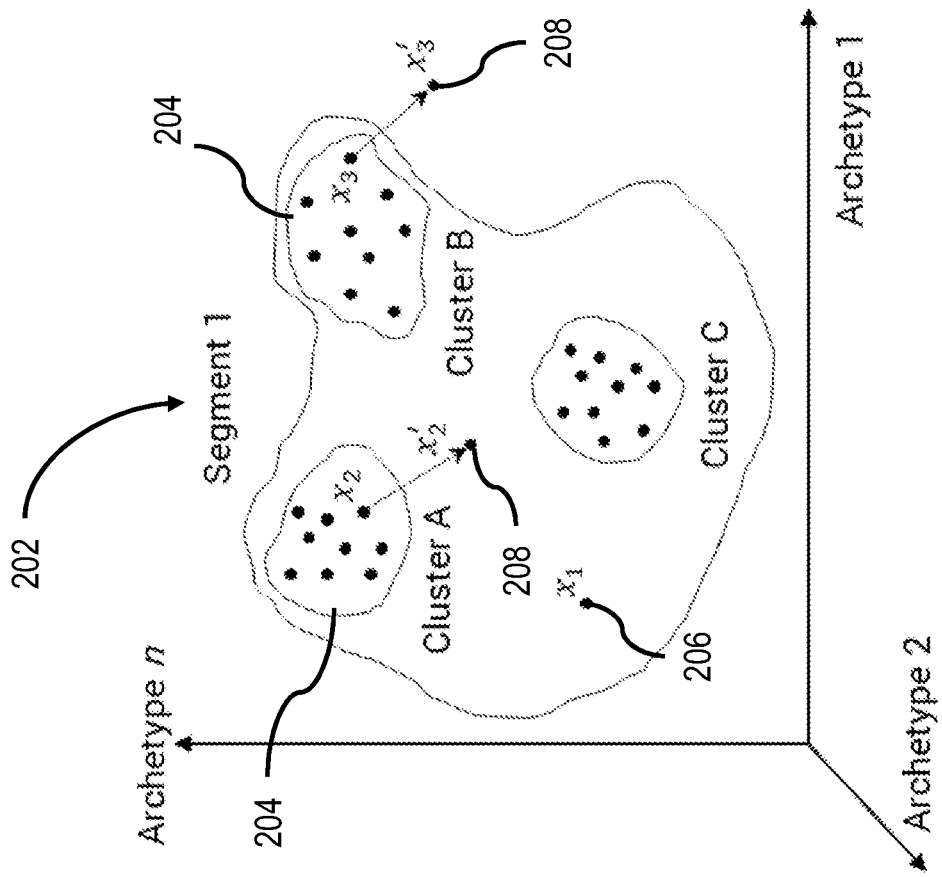
FIG. 2 is an illustration of a segment of entities clustered into archetypes using a method having one or more features consistent with the present description.

The generated archetypes have been shown to be highly interpretable. Oftentimes, the archetypes can, themselves, be assigned physical interpretable meanings. In the AML use-case, these physically interpretable meanings can aid in review of customer behaviors or characteristics. The archetypes can be used to track how those behaviors are changing over the history of the relationship that the customer has with the bank. Customers are a distribution typically in this set of archetypes. Particularly interesting are situations where changes in customer archetypes point to more alignment with money laundering characteristics. Another interesting use-case is to cluster all customers within a single fixed hard customer segmentation and find outliers that don't belong within defined clusters of archetypes for that segment. FIG. 2 is an illustration of a segment 202 of entities clustered into archetypes 204 using a method having one or more features consistent with the present description. Outlying entities 206 can be observed falling outside of the archetype clusters 204. These outliers 206 can identify customers that are then reviewed for re-assignment to a different customer segment, or investigation of transaction activity for possible SARs. Finding customers that are outliers from the characteristics of their KYC segmentation allows financial institutions to immediately understand that these customers don't resemble others in that segment and that the rules designed to work on the larger consistent population will not apply to these outlier customers and different actions are needed for effective monitoring.

Deviating entities 208 include entities that were once within a clustering of archetypes but have deviated from that clustering. The archetype itself may be dynamic, wherein the characteristics of the entities associated with a particular archetype change with time. Deviating entities 208 can be entities that are changing in a different manner compared to the majority of the entities in the archetype. Deviating entities 208 can indicate "sleeper" entities, radicalized entities, or the like. The deviating entities 208 and the outlying entities 206 can be flagged for follow-up investigation.

When using the LDA model in scoring mode, we update the archetype loadings in real-time within the transaction profile of the entity (e.g., customer, account or device). An example algorithm to accomplish this is described in U.S. patent application Ser. No. 14/566,545 ("the '545 App."), titled "Collaborative Profile-Based Detection Of Behavioral Anomalies And Change-Points" filed Dec. 10, 2014, which is incorporated herein in its entirety. The '545 App. provides support for using the analytic techniques therein to allow for profiling of demographic, non-monetary, and monetary financial transaction data and utilizing real-time collaborative profiling to determine archetypes based on streaming financial data. The '545 App. describes a method for recursively updating the archetypes in an entity's transaction profile as data streams into a scoring model. Using these techniques allows a set of real-time profile-based AML archetypes to be continually maintained or refined as real-time demographic, non-monetary, and monetary financial transaction is monitored.

Real-time profiles of archetypes, and/or changes in the archetypes with each new customer or account transaction, can be used to track the archetypes and determine where intervention is required.

Figure 3:
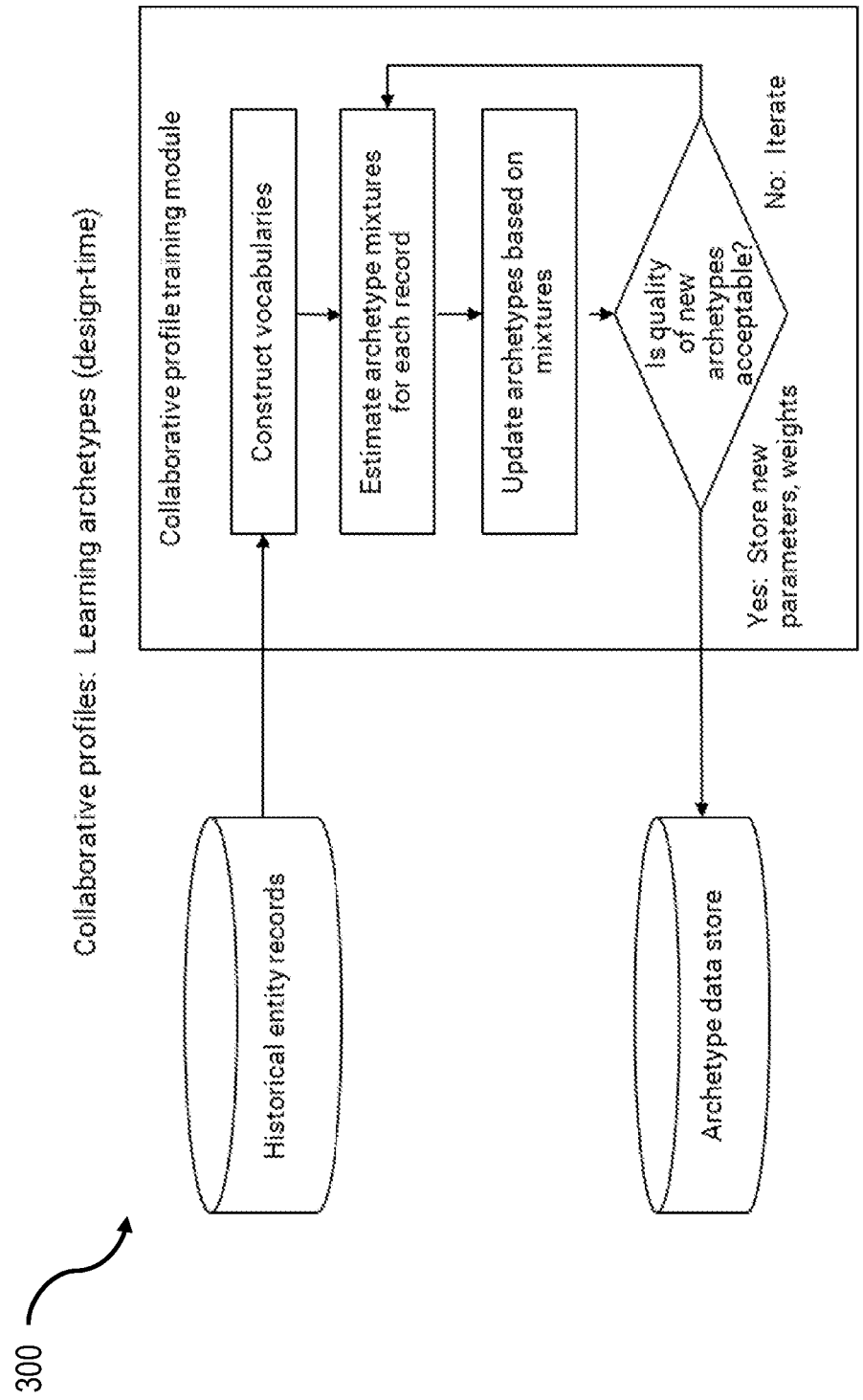
FIG. 3 is a schematic illustration of an offline archetype learning system (based on collaborative profiling) having one or more features consistent with the present description.

FIG. 3 is an illustration of an offline learning system 300 having one or more features consistent with the present description. There are three stages to using collaborative profiles to produce the soft-clustering misalignment score (SCM): (a) design-time archetype learning; (b) online estimation of archetype mixtures (soft-clustering); and, (c) creating features from the archetypes that detect misalignment. A small fixed number of archetypes (for example, 10-100) can be learned from historical data in an offline learning process.

With reference to FIG. 1, when the system 100 is operating online at run-time, for each input record, the current mixture of archetypes that best represent the entity can be estimated. Rather than picking a single archetype that best represents the entity, this mixture of archetypes can include a percentage weighting for each archetype, which forms a soft-clustering of the entities.

Each archetype is a vector of weightings on a fixed-sized vocabulary of words, which can be estimated from the training data. For a particular domain, such as AML, the input data must be converted into one or more vocabularies. The type of data and vocabularies that can be used for learning collaborative profile archetypes in the AML domain are described below. Typically vocabularies are a fixed size, on the order of 10-10,000 words, however some online LDA methods offer heuristics to adapt to a non-stationary, non-fixed length vocabulary size.

Once the archetype distributions have been estimated and updated for an entity based on current input data, these distributions are used as input to a variety of distance measures and clustering methods. Under the assumption that the vast majority of customers and accounts are legitimate and behave consistently over time, the set of archetypes learned will easily represent the legitimate entities. Most entities will then be mapped to small number of archetypes, and that mapping will change only gradually.

As an entity's behavior changes over time, the degree and rate of change and unpredictability, known as "surprise" can be measured and quantified (see the '545 App). There are two general methods for calculating scalar surprise scores from archetype estimates: predictive estimators and archetype allocation change.

The first method is based on the predictiveness Lt of the model to estimate the current data xt from the previous state of the profile at t−1. Functions of Lt, such as temporally smoothing with exponential decays, can also be applied to create predictive estimators.

The second method is based on the change in archetype allocation, between the current archetype estimate, and the previous time-step, θt−1. A distance measure Dt=d(θt, θt−1) can be constructed, using standard metrics such as Euclidean distance, Jenson Shannon divergence, mean-square difference, or the like.

A multitude of methods exist for distance measures and can be applied to the problem above. The above methods are provided as examples only.

The collaborative profiling archetypes described above are trained using vocabulary words associated with each entity but regardless of their order. This bag-of-words model of each entity allows the trainer to create a set of archetype vectors that weight the words as associated with the archetype. The time extent or membership of the bag-of-words can be adjusted based on design, but sequences of patterns are not captured unless explicitly expressed in the vocabulary. Time series data, such as transactions, may naturally have repeated or regular structure, which is not captured in the collaborative profile or archetype mixture (even when that mixture is update online for each entity) due to the bag of words approach.

In addition, collaborative profiles specify one, and only one, word from each dictionary at a time. This makes is difficult to learn correlations between the types of data in each vocabulary that occur in proximity with one another or sequences unless explicitly defined as a new word. While composite vocabularies can be constructed from the Cartesian product of two or more vocabularies, this quickly leads to an explosion of vocabulary dimensionality.

To create archetypes that capture sequential information, described is a complementary recurrent sequence modeling method, based on recurrent neural network architectures. Representations of data for recurrent sequence modeling can be concatenations of words from the collaborative profile vocabularies, or they can be other transformations of input data. Sparse representations of data can include single non-zero units (similar to CP word mappings), or distributed spare representations (where a small set of non-zero units is active with value 1.0 to represent values of categorical input). Dense embeddings represent high-dimensional data within a fixed vector length, where each value is mapped to a random vector which each element drawn from a continuous distribution (typically uniform). Sparse distribution representations and dense representations have the advantage that additional input values can be added without changing the network size parameters (i.e., not limited to a fixed vocabulary).

Figure 4:
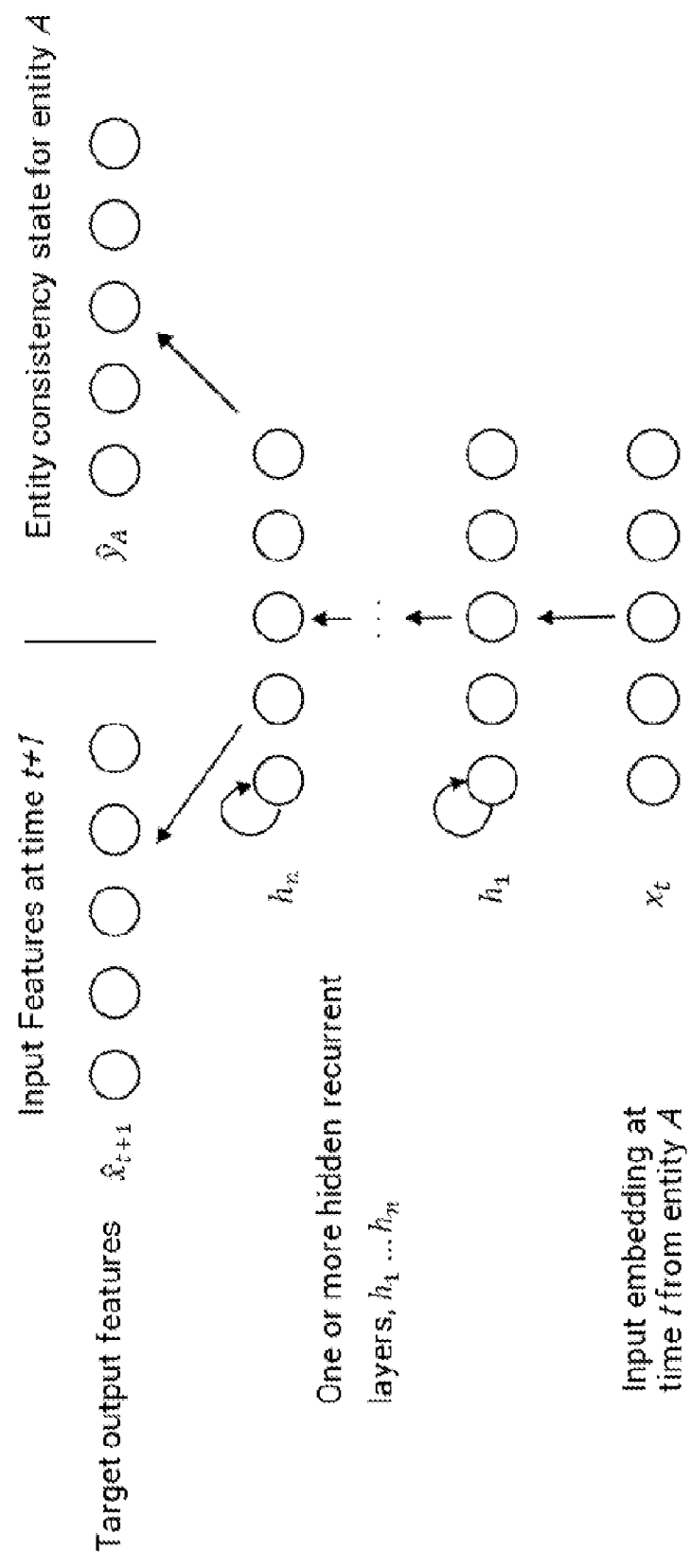
FIG. 4 is an illustration of a design-time architecture of a network used for recurrent sequence modeling, the network having one or more features consistent with the present description.
Figure 5:
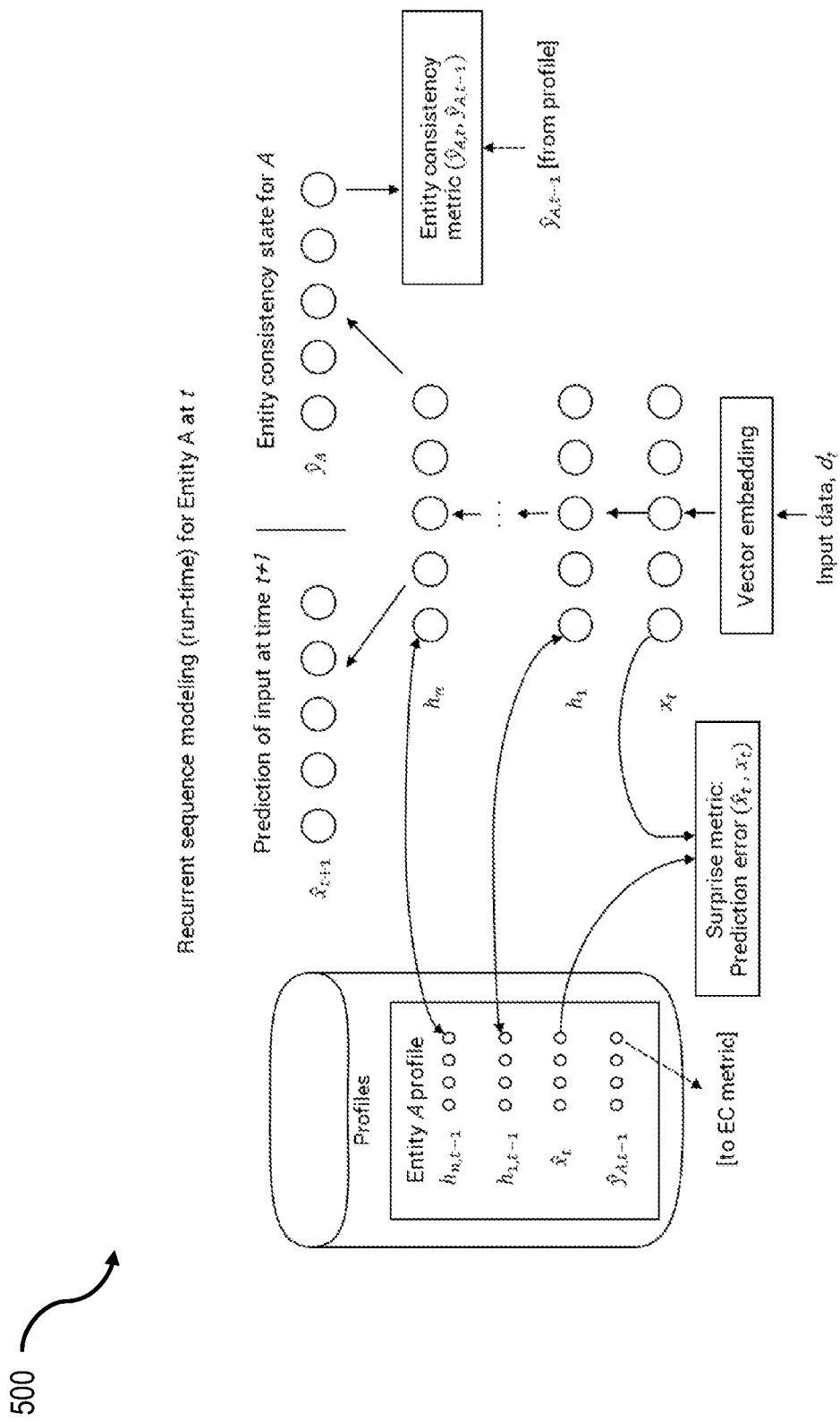
FIG. 5 is an illustration of a process for using recurrent sequence model (RSM) at run-time to estimate one or more metrics, the process having one or more features consistent with the present description.

FIG. 4 is an illustration of a design-time architecture 400 of a network used for recurrent sequence modeling, the network having one or more features consistent with the present description. FIG. 4 illustrates that recurrent sequence modeling relies on a recurrent neural network architecture. At design-time, the recurrent network architecture includes n hidden recurrent layers, which take input current features xt, process them through the hidden layers, which are adapted to learn two things: (1) a prediction of the input features at the next time step, $\hat{x}_{t+1}$ and (2) the entity consistency state for entity A, $\hat{y}_A$. The entity consistency state is trained to reflect a stable representation of the entity (assuming design-time training on normal behavior), as a function of the previous hidden layer states and the input. At run-time, hidden layer states for each entity are retrieved from the profile store, updated based on the weighted inputs and recurrent weights, and then stored in profile data store, for example, see FIG. 5. FIG. 5 is an illustration 500 of recurrent sequence modeling for Entity A at time t.

FIG. 4 shows the design-time architecture of the network used for recurrent sequence modeling. The units in hidden layer hi in FIG. 4 may be either basic recurrent units (which take input from hi the previous time step t−1), or more complex units with multiplicative gating, which serve to retain values over many time steps until an appropriate forgetting signal (often known as long short-term memory (LSTM) units). A combination of basic and complex recurrent units is possible throughout the hidden layers h1 . . . hn. The full recurrent sequence model (RSM) network is trained using stochastic gradient descent.

One of the target outputs during design-time training is a one-step ahead prediction output, i.e., the network at time t is trained to predict its input at the next time step, $\hat{x}_{t+1}$.

"Unsupervised supervision" is the technique of creating a stable target representation $\hat{y}_A$ (known as the entity consistency state) for each entity A seen during training, and during run-time, we compare previous and current states using Entity Consistency Metrics. The representation is constant for all records from A during design-time, and by using this method, the hidden layers of the network are trained towards stable features that represent some constant property of entities seen during training. At run-time, typically we will see new entities not seen during training, and so a key feature of yA is its temporal stability, which will be achieved if the hidden layers have captured a time-invariant representation of the behavior. At run-time, the entity consistency state, yA (and optionally hidden layer state hn) may be seen as analogous to the archetype mixture Once the higher-layer network representations have been estimated for each new time series (e.g., set of transactions), these can be used in multiple ways to estimate the amount of change or surprise in the current behavior compared with what the model has predicted.

As discussed above, the surprise metrics for the recurrent sequence model can be computed based on the predicted state $\hat{x}_{t+1}$ for predictive estimators, and the "entity consistency metric" $yA,t$ or highest hidden layer $hn,t$ (or any combination) for archetype allocation change metrics. FIG. 5 shows the process 500 for using the RSM at run-time to estimate these metrics.

FIG. 5 illustrates the run-time usage of recurrent sequence modeling for given entity A. Input data from entity A can be converted into a vector $xt$ through the embedding process. Then, the prediction of $xt$ based on the past state for entity A from $t-1$ and the corresponding hidden layers are retrieved from the profile data store. To use the RSM network for misalignment estimation, two types of metrics can be used: surprise metrics based on prediction error (network's estimate of $\hat{x}t$ from the profile, compared with current input $xt$) and entity consistency metric (based on the entity consistency state $Y^A,t$ compared with that from the profile $Y^A,t-1$). The entity consistency state may also include $hn$, i.e., the last hidden layer in the network also has consistency properties, although for clarity we have only shown $Y^A,t$ in the entity consistency state. The final step is that a future predicted $\hat{x}t+1$ can be estimated and stored along with the updated hidden layers in the profile store.

In some variations, a soft-cluster misalignment (SCM) score can be generated from the components discussed above. The SCM can be used to detect misalignment of entities in a segment, changes in behavior of entities, and in the specific case of AML, how the SCM score can be used operationally to detect behavioral changes from previous clusters and archetypes, and to direct AML investigations.

The SCM score can be real-valued or an integer value. The integer value can be in [1,999]. The SCM score can be calculated for each entity (e.g., account or customer) at the time of each input data record (transaction or non-monetary event). The goal of the SCM score is to score higher for those events where the entity behavior is not aligned with dominant archetype clusters in a segment, or no longer aligned with the archetypes and soft-clusters that previously were representing the entity. In traditional AML systems, a large number of alerts are generated by rules. Further action based on those alerts must be decided on by human case-workers. Due to limited case-worker resources many alerts go uninvestigated. It is vital that the SCM score accurately prioritize entities based on how misaligned or anomalous they are. Some exemplary situations where the SCM score would be high include:
 a) A new customer does not align closely to the clusters within his fixed customer segment, indicating an immediate misalignment between the customer's application and their initial behavior and that of other customers in the segment.
 b) An existing customer shows divergence away from their previous cluster and away from the other clusters in their segment. This would score relatively high, as an indication of misalignment with the behavior of known good customers in that segment. In general, higher scores are given for more rapid changes in behavior and cluster misalignment.
 c) An existing customer moves from one cluster in their current segmentation to another cluster, also within that segmentation. This would only score moderately highly, as the change in behavior is towards existing representative behavior within that segment.
 d) An existing customer moves from one cluster in the current segment to within a cluster of another different customer segment. This would score relatively higher than case c) as it would indicate a need to re-evaluate the customer's segmentation for accuracy in the AML rules that generate customers to investigate, and may show some deception or sleeper account activity.
 e) If SARs are available (either during the model training or at run-time), this information can be used to augment the SCM score. By finding which customers and accounts have had SAR filing, and determining the relation to the learning archetypes and clusters, the SCM score can be raised if the customer's current archetype and cluster have higher relative risk.

In addition to the SCM score, descriptive information concerning the customer and their score can be facilitated by generating reason codes. Reason codes are a set of discrete values, associated with text descriptions, which are produced at the time of each SCM score. A small number (typically in the range of 3-5) reason codes are generated for each score, which can help explain the cause of a high score, and therefore help the case-worker decide appropriate actions.

Figure 6:
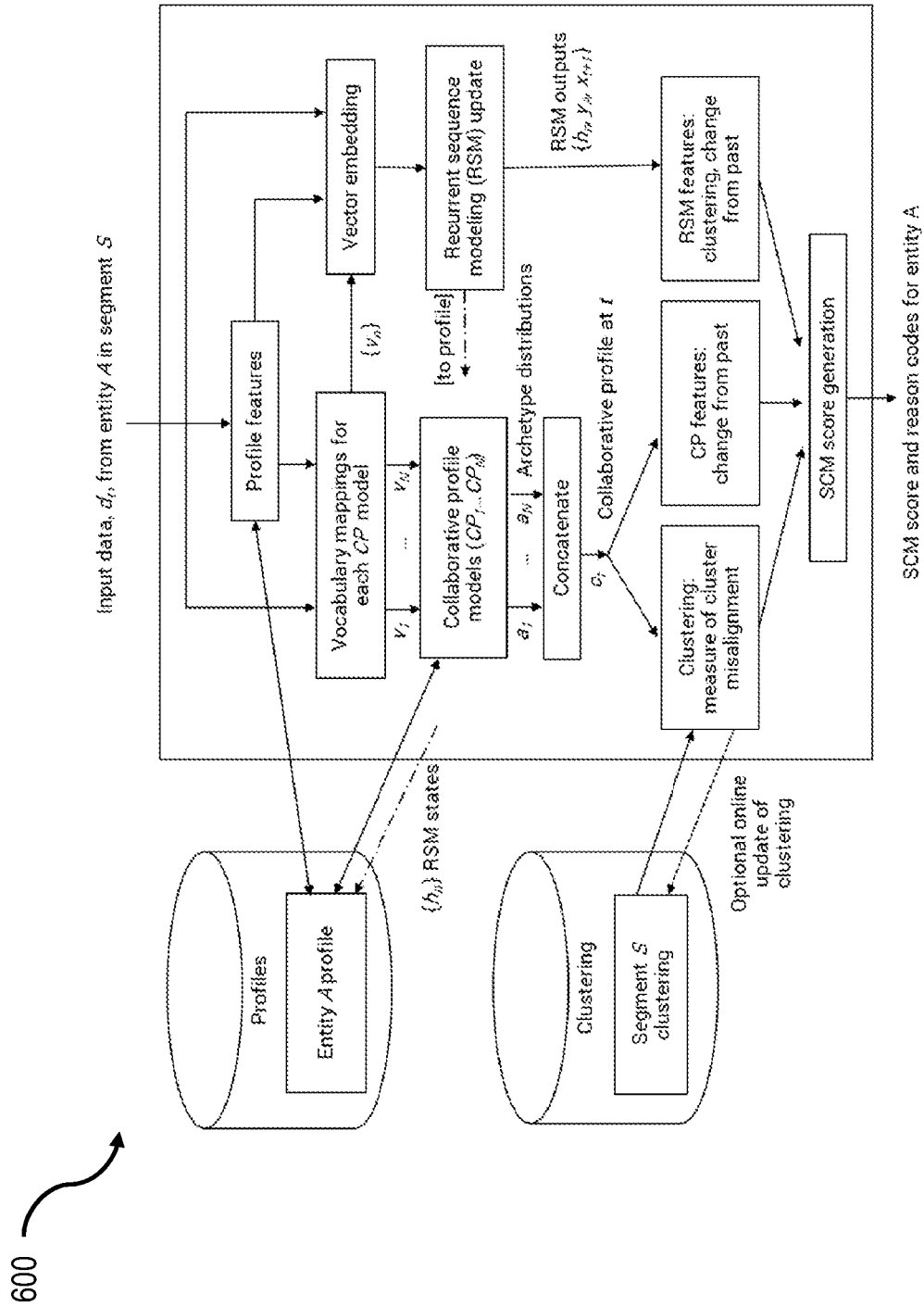
FIG. 6 is an illustration of a system for run-time generation of a soft-clustering misalignment (SCM) score, the system having one or more features consistent with the present description.

FIG. 6 is an illustration of a process 600 for generating the SCM score at runtime, the process 600 having one or more features consistent with the present description. The process 600 can be configured to generate the SCM score using collaborative profiling and recurrent sequence modeling.

The raw data input to the SCM score model for AML can include transactional and non-monetary data drawn from multiple systems within a financial institution, including:
 a) Transaction data (amounts, dates, channels, accounts, etc. regarding payments, transfers, debits, fees),
 b) Account state (balances, overdraft amounts, credit limits, overpayment on credit lines),
 c) Application data (initial customer and account application data which includes typical KYC as well as EDD information),
 d) Customer updates (address, phone, line-of-business changes),
 e) Channel specific information (online banking login, page view, beneficiary setup, mobile banking details).

Because this raw data has multiple types (such as text, categorical, numerical and dates) it must be converted to a standard numerical type before it can be used in the soft-clustering methods. A variety of methods are used to convert the data (including combinations), such as profiling features, mapping to words in vocabularies, binning, sparse and dense encodings.

Profiling features are constructed by transforming the input data with a function (such as an exponentially decayed average) that combines a current value from an input record with values from previous time steps as retrieved from the profile data store (see above). For banking transactions, profile features can include exponentially decayed averages of the transaction amounts, or exponentially decayed averages of counts of certain events, like transactions of certain type such as international wire transfers).

Before being presented to the collaborative profile (CP) archetype mixture updating module, the raw data and profile features are converted into discrete values from the vocabularies. Typical vocabularies that can be constructed for the AML domain include:
 a) From raw transaction data, transaction amount can be binned into discrete values, at regular, logarithmic or other scales. Transaction time can be discretized into hour-of-day, day-of-week, month-of-year, or any combination of similar binning. Transaction type characteristics such as the access channel (mobile, internet, teller, etc.) and processing channel (ACH, wire, SWIFT, EFT) are naturally a small discrete set of values that can be combined into a vocabulary. Source and destination country (and region if available) can be used.

b) Other financial information such as discretized ledger balance and available credit can be used for vocabularies.

c) From internet banking transactions, vocabularies can be constructed from the type of activity (e.g., login event, balance check, transfer initiation, beneficiary changes, and password changes). Device information, such as browser fingerprinting features (browser version, OS, language, session length) can also be converted into discrete vocabularies.

d) From mobile banking transactions, a vocabulary can include features not specific to the transaction, but general types of behavior and biometrics from the user of the device. Vocabularies can be constructed from the genre of mobile apps, geographical locations, wifi/cellular and network details.

e) Customer information from the KYC process (both during on-boarding and subsequent updates) can be included in vocabularies. Some information from the enhanced due diligence (EDD) in the KYC process is unstructured text documents, and in those cases, the vocabularies can be literal words (such as occupation, business type, etc.).

f) From profile features constructed from any of the features (a)-(e), such as exponential decays of amounts and event average values, after suitable binning into a discrete vocabulary.

g) Combinations of type of vocabularies (a)-(f) can be used, e.g., binned amount+destination country. Also, binary indicators of customer risk, such as appearance on watch-lists and enhanced due diligence (EDD), can be concatenated onto any of the vocabularies.

Similarly, for recurrent sequence modeling (RSM), the raw data and profile features are converted into an embedding (either sparse or dense) for run-time estimation of the recurrent states. Any combination of the vocabularies created for CP can be combined into embeddings for input to RSM.

During run-time, after the input data and profile features are mapped into the appropriate vocabularies, the CP archetype distributions are updated for that entity, and those updated archetype distributions are saved back into the profile data store. If the entity's behavior has changed dramatically during the recent past, the archetype distribution will change significantly, otherwise it is expected the archetype distribution will change only gradually.

Usually, a SCM model will use multiple separate CP models each based on a different set of vocabularies, and the outputs from all these CPs are vectors of archetype distributions for each vocabulary.

Many distance measures can be used to convert the CP archetype distribution vectors into a scalar value that summarizes the changes in archetypes, such as the surprise scores discussed above. These distance measures and surprise scores help capture changes in an entity's behavior over time.

The archetype mixture distributions are designed to represent the full set of behaviors seen for all entities (typically all the customers within a particular segmentation). Some archetypes tend to be more common than others within that segmentation, and to capture the major types of behavior seen with that segment, the archetypes mixtures are compared against a set of clusters in the archetype space for the segment. The clusters are learned for each of the bank's segmentations (assuming they meet a minimum size), and can be learned initially at design-time, and then optionally updated at run-time. Clustering can be done in archetype space with a variety of algorithms, including with any of the variants of k-means clustering. Misalignment is quantified by measuring the distance from each of the clusters in the segment, using distance measures such as Euclidean distance, Mahalanobis distance or Manhattan distance. If the misalignment is low enough by the chosen measure, indicating belonging to an existing cluster in the segment, then if on-line cluster updating is desired, that cluster is moved slightly towards the current data point.

For recurrent sequence modeling (RSM) at run-time, the embedded representation of the profile and input data is presented to the input layer of the network, where it is combined with the previous values of the hidden layers (retrieved from the profile data store associated with that entity), and propagated upwards through the network. At the highest layers of the network, distance measures can be applied to the predicted output $x_{t+1}$ or the entity consistency state $y_A$ (and optionally hn) Similarly to the CP module, clustering and dissimilarity measures can be applied on the entity consistency measure. As the RSM networks are trained on typical good behavior of entities, the layer hn and $y_A$ states will learn stable representations which capture the temporal and sequence dynamics of the good population of entities, and so clustering techniques can be used on the hn and $y_A$ states as well as the misalignment distance measures discussed about for the CP k-means clustering.

Prediction accuracy features can be generated from the RSM by looking at how accurately it predicts the sequence of behavior, i.e., comparing the actual embedding state $x_t$ with the predicted output at the previous time step (the top layer $\hat{x}_t$), using Euclidean distance, optionally in combination with normalization based on properties of the embedding. For example, if the sparse embedding is a binary vector (e.g., [0,1,0,0,1]), and the prediction output is a real vector (e.g., [0.1, 0.5, 0.0, 0.2, 0.4]) normalization of each element towards {0,1} may help judge that this prediction is reasonably accurate. By comparing CP and RSM predictiveness measures, the CP model can predict the likelihood of words in the vocabulary based on the current archetype mixture, which the RSM network can use to detect suspicious changes in the ordering of event activity, due to conditioning on the previous state.

The soft-cluster misalignment (SCM) score can be created by combining the features from the clustering misalignment measures (on how the entity compares with the segment population), the change/surprise measures (on how the entity is changing behavior compared with its past history), and the RSM features (on how the sequences of activity and predictability of the entity are changing). Each of these features can be weighted, either by hand using expert knowledge, or by a training procedure where the score distribution is shaped by evaluating on known normal entities.

Reason codes can be assigned to each score based on which feature components are driving the score higher. This facilitates understanding by a case-worker of types of behavior changes. For example, entities can have a changed behavior compared to the entity's past behavior or compared to the behavior of the entities in the population clustering.

In problem domains where labels of entity risk are available, this risk information can be optionally incorporated into the SCM score. Additional features can be constructed which can influence the score, based on the relative risk of archetypes, clusters or segments. In the case of AML, filed SAR reports can be a source for such risk information, and can be incorporated historically or during run-time, to influence risk-based features.

Figure 7:
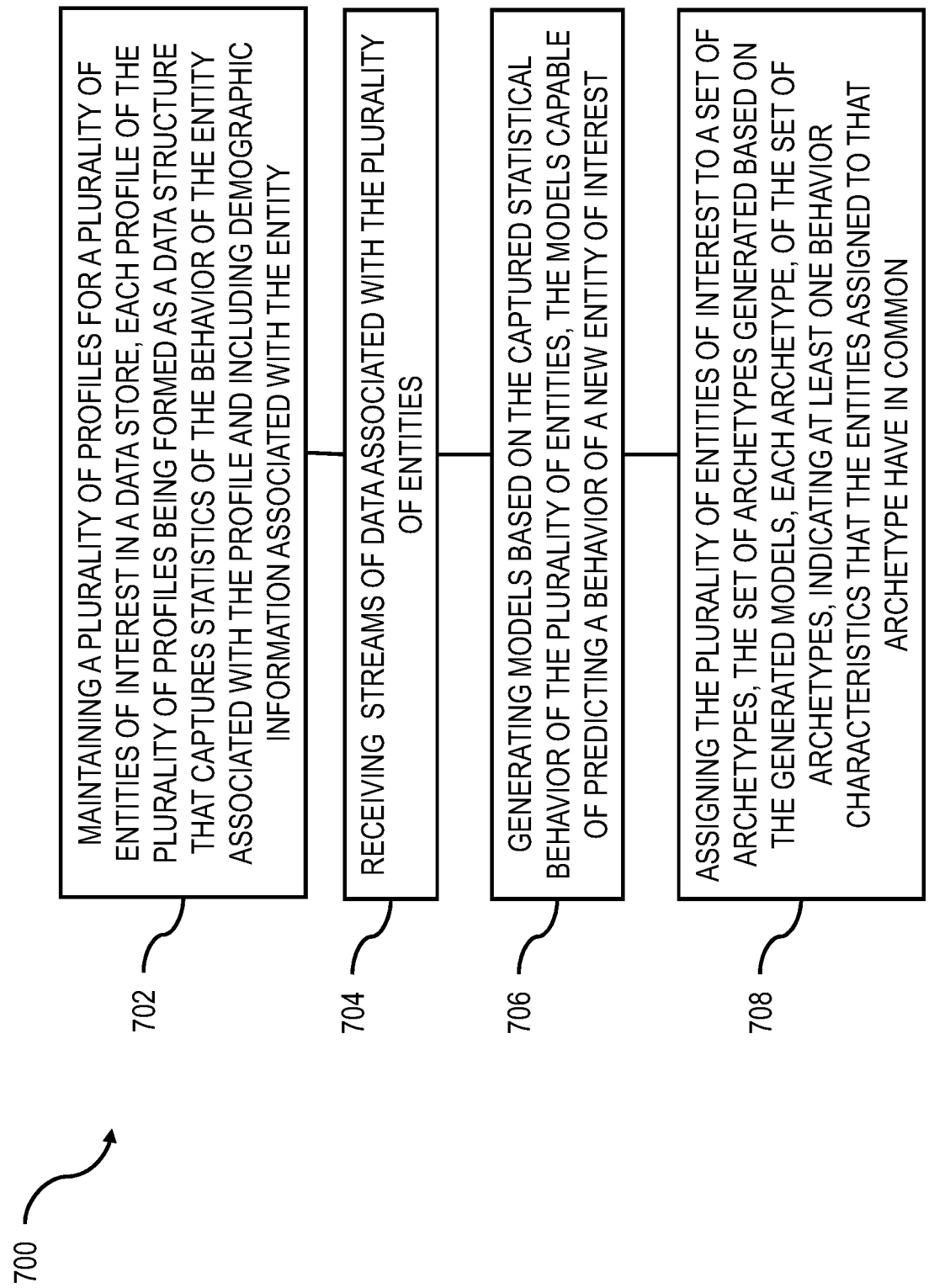
FIG. 7 is a process flow diagram of a method having one or more features consistent with the present description; and, FIG. 8 is a process flow diagram of a method having one or more features consistent with the present description.

FIG. 7 is a process flow diagram of a method 700 having one or more features consistent with the present description. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting.

In some embodiments, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

At 702, a plurality of profiles can be maintained for a plurality of entities of interest in a data store. Each profile of the plurality of profiles can be formed as a data structure that captures statistics of the behavior of the entity associated with the profile. Each profile can include demographic information associated with the entity.

At 704, streams of data can be received. The streams of data can be associated with the plurality of entities.

At 706, models can be generated based on the captured statistical behavior of the plurality of entities. The models can be capable of predicting a behavior of a new entity of interest.

At 708, the plurality of entities of interest can be assigned to a set of archetypes. The set of archetypes can be based on the generated models. Each archetype, of the set of archetypes, can indicate at least one behavior characteristic that the entities assigned to that archetype have in common.

Figure 8:
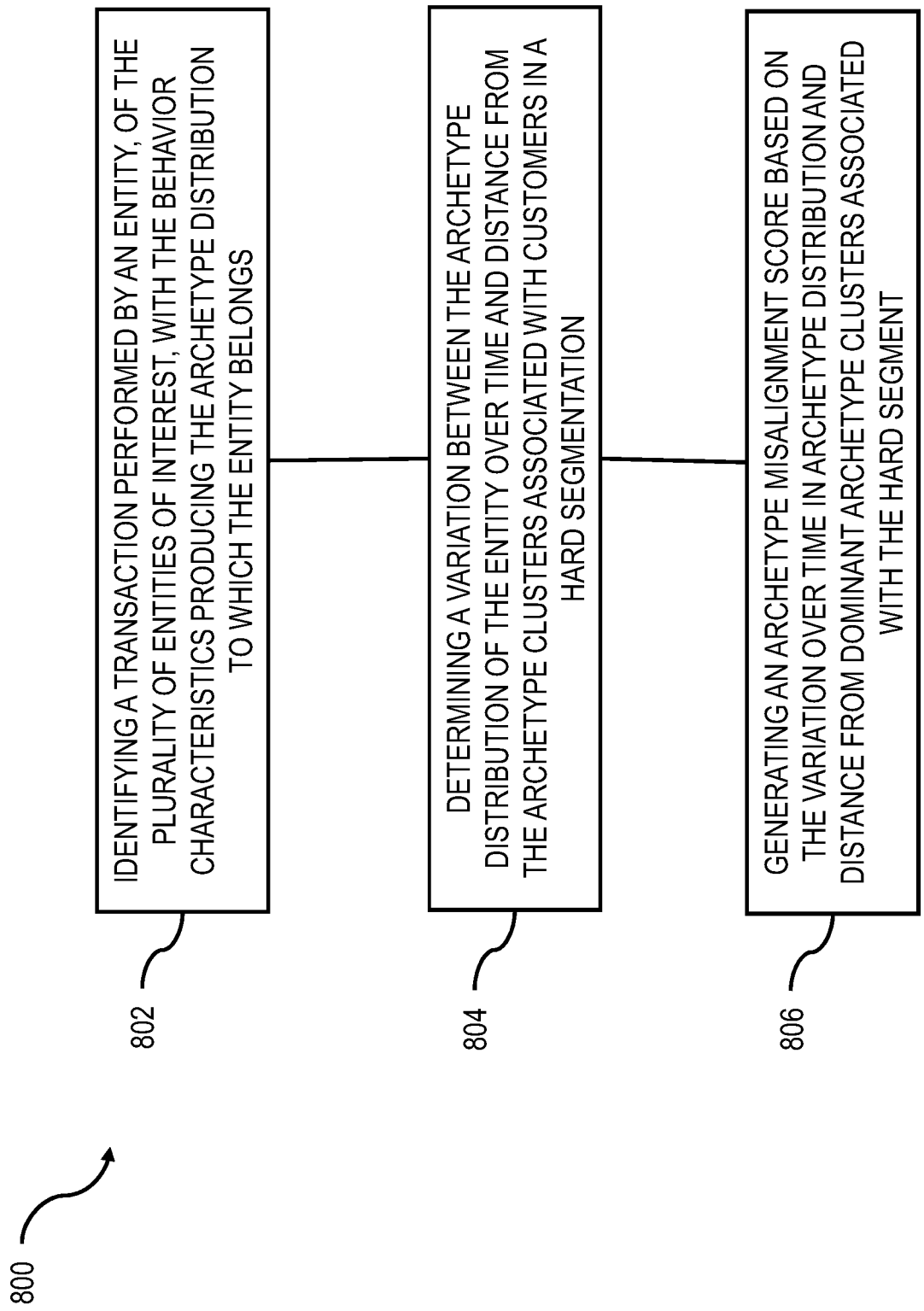

FIG. 8 is a process flow diagram of a method 800 having one or more features consistent with the present description. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8 and described below is not intended to be limiting.

In some embodiments, method 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 800 in response to instructions stored electronically on an electronic storage medium. The one or more processing devices may include one or more devices configured through hardware, firmware, and/or software to be specifically designed for execution of one or more of the operations of method 800.

At 802, a transaction performed by an entity can be identified. The transaction can be identified from the stream of data. The transaction contains behavior characteristics producing the archetype distribution to which the entity belongs.

At 804, a variation can be determined between the archetype distribution of the entity over time and distance from the archetype clusters associated with customers in a hard segmentation At 806, an archetype misalignment score can be generated based on the variation.

Alerts and/or reports can be generated in response to an indication that an archetype misalignment score for an entity exceeds a threshold. An alert can be a piece of data transmitted to one or more other systems to cause those other systems to perform additional processing. The additional processing can be associated with anti-money laundering techniques to determine whether the entity in question is involved in illegal activity. The additional processes can be associated with techniques that determine whether an entity has become radicalized.

In some non-limiting examples, the presently described subject matter can facilitate determining when an entity's behavior is misaligned with a preconceived segmentation. Determining this misalignment of entity behavior is an important problem which can be tackled by developing a soft-clustering misalignment (SCM) score. The SCM score can be based on examining clusters of behavior representations such as collaborative profiling (CP) archetypes and recurrent sequence modeling (RSM) entity consistency states. Both CP archetypes and RSM entity consistency states allow for an entity to be modeled as a mixture of topics, and so these representations are termed "soft-clusterings". The advantage of soft-clustering representations is that they are more meaningful, interpretable and lower-dimensional compared with the original input data. In some implementations, once the soft-clustering representations are created, a more traditional clustering approach, like k-means, can be applied. Each predefined segmentation can be modeled as a set of these k-means clusters, and if an entity does not fit into one of these clusters initially, or diverges away from its cluster over time, it can indicate important behavior that should be investigated.

In the AML use-case, typical systems are based on rules specific to a customer segmentation. If a customer is misclassified (either due to a falsified application, sleeper account activity, a gradual radicalization towards an extremist cause, or the like) typical rules designed for a specific segment may be invalid or misleading when applied to these behavioral outliers. Detecting such misalignment with segmentation is an important part of the AML workflow. Investigation of misalignment may find that the customer belongs in a different segment, due to their new behavior matching a cluster in another segment, or it may lead to investigation for laundering or other suspicious activity.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method to be performed by a computer processor, the computer processor forming at least part of a computer system, the method comprising:

maintaining one or more profiles in a data store for a plurality of entities of interest, at least one of the one or more profiles being formed as a data structure that, instead of containing a set of profile records of past activities of an entity, captures statistics of one or more behaviors of the entity associated with the profile, the data structure further including demographic information associated with the entity and an updated estimate of associated recursive transaction activity variables which drive a soft clustering of the entity to enable real-time detection of suspicious transactions, the soft clustering involving migration of the entity over time from a first soft cluster of archetypes to a second soft cluster of archetypes, and one or more models being generated based on the captured statistics of one or more behaviors of the plurality of entities, the one or more models being used by the computer processor for predicting a behavior of a new entity of interest;

assigning the plurality of entities of interest to hard segments of a segmentation scheme; and assigning one or more of the plurality of entities of interest to a set of archetypes, the set of archetypes being an archetype distribution and generated based on entity transaction behavior information and entity demographic information in the generated one or more models, at least one archetype of the set of archetypes indicating at least one behavior characteristic that the entities assigned to that archetype have in common.

2. The method of claim 1, further comprising:

identifying a transaction performed by an entity, of the plurality of entities of interest, wherein, the at least one behavior characteristic of the entity produces an archetype distribution to which the entity is assigned;

determining a variation over time between the archetype distribution to which the entity, of the plurality of entities of interest, is assigned and a distance from the set of archetypes soft clusters associated with other entities in the hard segmentation to which the entity is assigned;

generating a soft clustering misalignment score based on the determined variation, the soft clustering misalignment score indicating the degree of variation between the archetype distribution to which the entity is assigned and the set of archetypes soft clusters associated with the other entities in the hard segmentation to which the entity is assigned; and, generating an alert in response to identifying that the determined soft clustering misalignment score for the entity exceeds a threshold.

3. The method of claim 2, further compromising:

generating a report indicating entities having a soft-clustering misalignment score that is indicative of a need for further anti-money laundering investigation.

4. The method of claim 2, further compromising:

generating a report indicating entities having a soft cluster misalignment score that exceeds a threshold indicative that the entity needs to be reassigned to a different hard segment.

5. The method of claim 2, further compromising:
identifying an entity that has a soft cluster misalignment score indicative that the entity has migrated over time from a first soft cluster of archetypes to a second soft cluster of archetypes; and,
generating a report indicating that the identified entity exhibits sleeper behaviors or radicalization.

6. The method of claim 1, further comprising:
receiving one or more streams of data associated with the plurality of entities and wherein the models are generated based on the received streams of data.

7. The method of claim 6, wherein the one or more streams of data include transaction data associated with the plurality of entities of interest.

8. The method of claim 6, wherein the one or more streams of data include demographic markers associated with the plurality of entities of interest.

9. The method of claim 6, further comprising:
updating the at least one behavior characteristic of at least one archetype of the set of archetypes, based on an update to the models caused by the received one or more streams of data associated with the plurality of entities.

10. The method of claim 1, wherein the one or more models are configured to translate the captured statistics of the one or more behaviors of the plurality of entities to the set of archetypes and to recursively update the archetypes in an entity's transaction profile.

11. The method of claim 1, wherein at least one archetype of the set of archetypes, to which an entity is assigned, indicates a behavior of the entity.

12. The method of claim 1, wherein at least one entity of the plurality of entities of interest are assigned to multiple archetypes of the set of archetypes.

13. The method of claim 1, wherein assigning individual entities of the plurality of entities of interest to a set of archetypes comprises:
utilizing, collaborative profiling of behavior events associated with the plurality of entities of interest, the behavior events associated with financial transactions performed by the plurality of entities; and,
utilizing, collaborative profiling of behavior events associated with the plurality of entities of interest, the behavior events associated with demographic data associated with the plurality of entities.

14. The method of claim 13, further comprising:
capturing behavior events by using recurrent networks technology to capture sequences of behavior events.

15. A system comprising:
at least one programmable processor; and
a machine-readable medium storing instructions that, when executed by the at least one processor, cause the at least one programmable processor to perform operations comprising:
maintaining one or more profiles in a data store for a plurality of entities of interest, at least one of the one or more profiles being formed as a data structure that, instead of containing a set of profile records of past activities of an entity, captures statistics of one or more behaviors of the entity associated with the profile, the data structure further including demographic information associated with the entity and an updated estimate of associated recursive transaction activity variables which drive a soft clustering of the plurality of entities to enable real-time detection of suspicious transactions,
one or more models being generated based on the captured statistics of one or more behaviors of the plurality of entities, the one or more models being used by the computer processor for predicting a behavior of a new entity of interest;
assigning the plurality of entities of interest to hard segments of a segmentation scheme; and,
assigning individual ones of the plurality of entities of interest to a set of archetypes, the set of archetypes being an archetype distribution and generated based on the generated one or more models, at least one archetype of the set of archetypes indicating at least one behavior characteristic that the entities assigned to that archetype have in common.

16. The system of claim 15, wherein the operations further comprise:
identifying a transaction performed by an entity, of the plurality of entities of interest, wherein, the at least one behavior characteristic of the entity produces an archetype distribution to which the entity is assigned;
determining a variation over time between the archetype distribution to which the entity, of the plurality of entities of interest, is assigned and a distance from the set of archetypes soft clusters associated with other entities in the hard segmentation to which the entity is assigned;
generating a soft clustering misalignment score based on the determined variation, the soft clustering misalignment score indicating the degree of variation between the archetype distribution to which the entity is assigned and the set of archetypes soft clusters associated with the other entities in the hard segmentation to which the entity is assigned; and,
generating an alert in response to identifying that the determined soft clustering misalignment score for the entity exceeds a threshold.

17. The system of claim 16, wherein the operations further comprise:
generating a report indicating entities having a soft-clustering misalignment score that is indicative of a need for further anti-money laundering investigation.

18. The system of claim 16, wherein the operations further comprise:
generating a report indicating entities having a soft cluster misalignment score that exceeds a threshold indicative that the entity needs to be reassigned to a different hard segment.

19. The system of claim 16, wherein the operations further comprise:
identifying an entity that has a soft cluster misalignment score indicative that the entity has migrated over time from a first soft cluster of archetypes to a second soft cluster of archetypes; and,
generating a report indicating that the identified entity exhibits sleeper behaviors or radicalization.

20. The system of claim 15, wherein the operations further comprise:
assigning the plurality of entities to a set of archetypes, the set of archetypes being a archetype distribution, based on entity transaction behavior information and entity demographic information.

21. The system of claim 15, wherein the operations further comprise:
receiving one or more streams of data associated with the plurality of entities and wherein the models are generated based on the received streams of data.

22. The system of claim 21, wherein the one or more streams of data include transaction data associated with the plurality of entities of interest.

23. The system of claim 21, wherein the one or more streams of data include demographic markers associated with the plurality of entities of interest.

24. The system of claim 21, wherein the operations further comprise:
  updating the at least one behavior characteristic of at least one archetype of the set of archetypes, based on an update to the models caused by the received one or more streams of data associated with the plurality of entities.

25. The system of claim 15, wherein the one or more models are configured to translate the captured statistics of the one or more behaviors of the plurality of entities to the set of archetypes.

26. The system of claim 15, wherein at least one archetype of the set of archetypes, to which an entity is assigned, indicates a behavior of the entity.

27. The system of claim 15, wherein at least one entity of the plurality of entities of interest are assigned to multiple archetypes of the set of archetypes.

28. The system of claim 15, wherein assigning individual entities of the plurality of entities of interest to a set of archetypes comprises:
  utilizing, collaborative profiling of behavior events associated with the plurality of entities of interest, the behavior events associated with financial transactions performed by the plurality of entities;
  utilizing, collaborative profiling of behavior events associated with the plurality of entities of interest, the behavior events associated with demographic data associated with the plurality of entities.

29. The system of claim 15, wherein the operations further comprise:
  capturing behavior events by using recurrent networks technology to capture sequences of behavior events.

30. A computer program product comprising a non-transitory machine-readable medium storing instructions that, when executed by at least one programmable processor, cause the at least one programmable processor to perform operations comprising:
  maintaining one or more profiles in a data store for a plurality of entities of interest, at least one of the one or more profiles being formed as a data structure that, instead of containing a set of profile records of past activities of an entity, captures statistics of one or more behaviors of the entity associated with the profile, the data structure further including demographic information associated with the entity and an updated estimate of associated recursive transaction activity variables which drive a soft clustering of the plurality of entities to enable real-time detection of suspicious transactions,
  one or more models being generated based on the captured statistics of one or more behaviors of the plurality of entities, the one or more models being used by the computer processor for predicting a behavior of a new entity of interest;
  assigning the plurality of entities of interest to hard segments of a segmentation scheme;
  assigning one or more of the plurality of entities of interest to a set of archetypes, the set of archetypes being an archetype distribution and generated based on entity transaction behavior information and entity demographic information in the generated one or more models, at least one archetype of the set of archetypes indicating at least one behavior characteristic that the entities assigned to that archetype have in common;
  identifying a transaction performed by a first entity of the plurality of entities of interest, wherein the at least one behavior characteristic of the first entity produces an archetype distribution to which the first entity is assigned;
  determining a variation over time between the archetype distribution to which the first entity is assigned and a distance from the set of archetypes soft clusters associated with other entities in the hard segmentation to which the first entity is assigned;
  generating a soft clustering misalignment score based on the determined variation, the soft clustering misalignment score indicating the degree of variation between the archetype distribution to which the first entity is assigned and the set of archetypes soft clusters associated with the other entities in the hard segmentation to which the first entity is assigned; and
  generating a report, in response to determining that the first entity has a soft cluster misalignment score that exceed one or more thresholds, the report indicating that the first entity is to be reassigned to a different hard segment or that the entity has migrated over time from a first soft cluster of archetypes to a second soft cluster of archetypes;
  the report further indicating that the first entity exhibits outlier behavior, wherein archetype mixture distributions represents a set of behaviors for the plurality of entities of interest within one or more segmentations.

* * * * *